C. F. HUMMEL.
HIGH PRESSURE VALVE.
APPLICATION FILED FEB. 7, 1920.
1,374,571.
Patented Apr. 12, 1921.
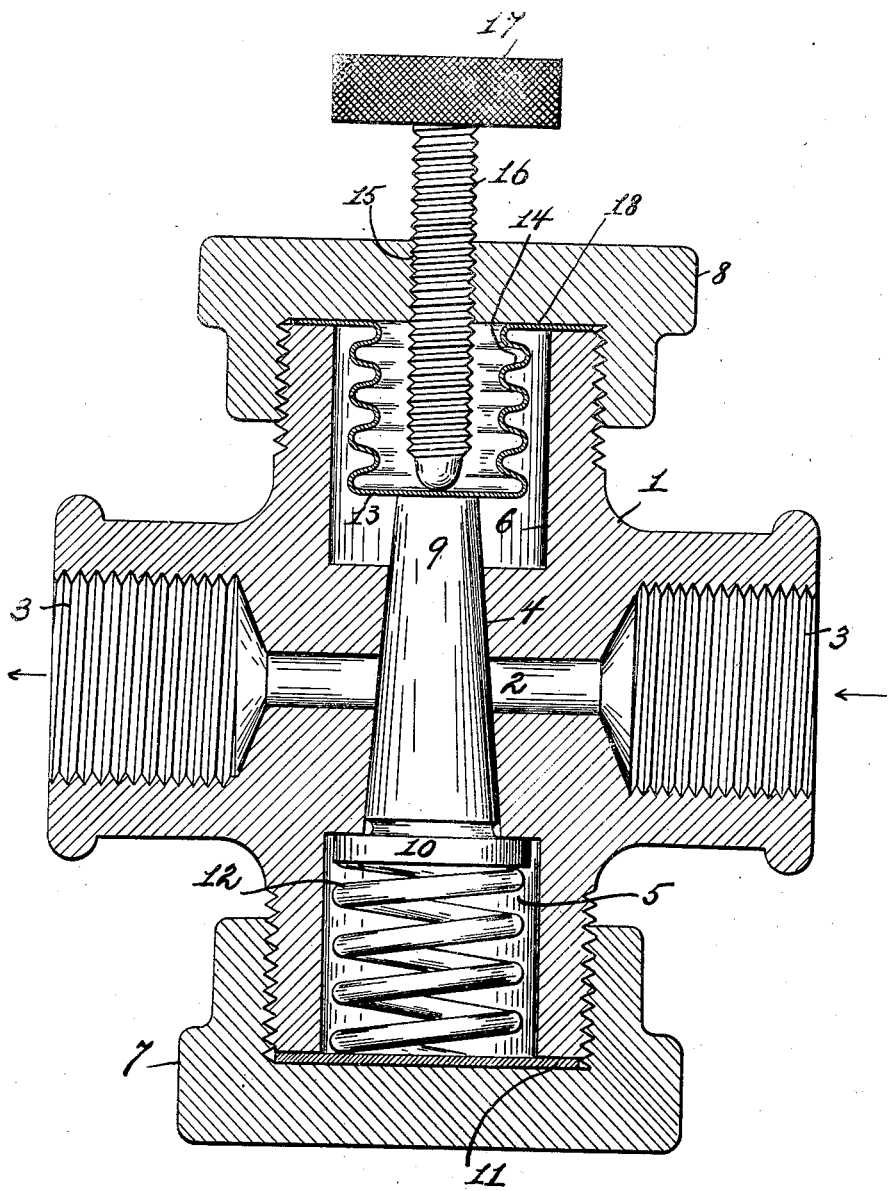
INVENTOR
Charles F. Hummel,
BY
Fredk C. Fischer.
ATTORNEY

UNITED STATES PATENT OFFICE.

CHARLES F. HUMMEL, OF ROSELLE PARK, NEW JERSEY.

HIGH-PRESSURE VALVE.

1,374,571. Specification of Letters Patent. Patented Apr. 12, 1921.

Application filed February 7, 1920. Serial No. 356,809.

*To all whom it may concern:*

Be it known that I, CHARLES F. HUMMEL, a citizen of the United States, residing in the borough of Roselle Park, in the county of Union and State of New Jersey, have invented certain new and useful Improvements in High-Pressure Valves, of which the following is a full, clear, and exact description, such as will enable others skilled in the art to which it pertains to make, construct, and use the same, reference being had to the accompanying drawings, and to numerals of reference marked thereon, forming a part of this specification.

My invention comprehends a high pressure valve of new and improved design, and the object of the invention is to devise a means, whereby an ordinary valve, such as a globe valve or an angle valve may be insured of being rendered fluid tight when manufactured, and of remaining so during continued use.

Further objects are to dispense with the use of packing, and prevent loss of pressure, and annoyance consequent on leakage.

In the accompanying sheet of drawing, I have shown the structure of the valve through the medium of a vertical sectional view, it being obvious, however, that many changes may be made in the size and shape without departing from the spirit of the invention as set forth.

The valve casing 1 is provided with a central bore or passageway 2 for the gas, extending therethrough, terminating in the screw-threaded cavities 3—3 designed to receive the ends of the pipe to which the valve may be connected.

A conical bore 4 cutting through the passageway 2, connects with the enlarged cavities 5 and 6 both of which are externally screw-threaded and have screw-threaded engagement with the internally screw-threaded caps 7 and 8.

Located in the conical bore 4 is a conical valve 9 one end of which is provided with an enlarged head 10 located within the cavity 5, and the opposite end of which projects into the cavity 6. A metallic gasket 11 is located in the cap 7 and interposed between it and one end of the valve casing 1, to insure a fluid tight joint.

Located within the cavity 5 is a spiral spring 12 one end of which bears against the gasket 11 and the enlarged head 10 of the conical valve 9, the pressure of the spring maintaining the valve closed against the valve seat when in closed position as shown in the drawings.

A metallic cup shaped diaphragm is located within the cavity 6 and is provided with an outwardly extending flange at its open end, designed to be clamped between one end of the valve casing 1 and the cap 8. This diaphragm is preferably formed of copper or bronze or other suitable material, having resilient qualities and capable of yielding under pressure.

The diaphragm 13 as illustrated in the drawing is provided with a series of corrugations 14. The cap 8 is provided with a screw threaded opening 15 designed to receive the screw-threaded portion of the adjusting screw 16, the outer end of which is provided with a head 17 and the inner end of which is designed to bear upon the inside of the diaphragm 13. The diaphragm 13 is further provided at its open end with an annular flange 18 which is interposed between one end of the valve casing 1 and the underside of the cap 8, to insure a fluid tight joint. The operation of the valve is apparent. In order to open the valve the adjusting screw 16 is screwed inwardly thereby flexing the diaphragm 13 and forcing the conical valve 9 inwardly away from the conical portion 4 against the pressure of the spiral spring 12 thereby enabling gas to pass through the passageway 2 in the direction indicated by the arrows.

Experience has demonstrated that the organization above described is a highly efficient one, and while I have shown the preferred embodiment of my present invention, I do not wish to be limited to the exact details of construction shown and described, as obvious modifications thereof, not involving the exercise of invention, may be made by any skilled mechanic, and such departures from what is herein set forth, I consider within the scope and terms of my claims.

Having thus described my invention, what I claim as new and desire to secure by Letters Patent is:—

1. In a high pressure valve, the combination with a valve body having an axial passage therethrough, and further provided with a tapered bore intersecting and communicating directly with the said passage, said tapered bore communicating with diametrically oppositely arranged cavities in the ends of the valve body, removable closures for the ends of the valve body in which said cavities are located, a tapered valve disposed in the said tapered bore and movable axially therein, a spring abutting at its inner end against the valve and at its outer end against the said closure, a yielding metallic resilient diaphragm, the closed end thereof abutting against the valve and the outer end interposed between the valve body and the mentioned closure.

2. In a high pressure valve, the combination with a valve body having an axial passage therethrough, and further provided with a tapered bore intersecting and communicating directly with the said passage, said tapered bore communicating with diametrically oppositely arranged cavities in the ends of the valve body, removable closures for the ends of the valve body in which said cavities are located, a tapered valve disposed in the said tapered bore and movable axially therein, a spring abutting at its inner end against the valve and at its outer end against the said closure, a packing interposed between the end of the valve body and the said closure, a yielding metallic resilient diaphragm, the closed end thereof abutting against the valve and the outer end interposed between the valve body and the mentioned closure, and a screw-threaded stud in the closure movable into and out of engagement with the bottom of the said diaphragm.

3. In a high pressure valve, the combination with a valve body having an axial passage therethrough, and further provided with a tapered bore intersecting and communicating directly with the said passage, said tapered bore communicating with diametrically oppositely arranged cavities in the ends of the valve body, removable closures for the ends of the valve body in which said cavities are located, a tapered valve disposed in the said tapered bore and movable axially therein, a spring abutting at its inner end against the valve and at its outer end against the said closure, a collapsible corrugated diaphragm closed at one end and provided with a flange at the open end, the closed end thereof abutting against the valve and the flanged end interposed between the valve body and the mentioned closure.

4. In a high pressure valve, the combination with a valve body having an axial passage therethrough, and further provided with a tapered bore intersecting and communicating directly with the said passage, said tapered bore communicating with diametrically oppositely arranged cavities in the ends of the valve body, removable closures for the ends of the valve body in which said cavities are located, a tapered valve disposed in the said tapered bore and movable axially therein, a spring abutting at its inner end against the valve and at its outer end against the said closure, a collapsible corrugated diaphragm closed at one end and provided with a flange at the open end, the closed end thereof abutting against the valve and the flanged end interposed between the valve body and the mentioned closure, and a screw-threaded stud in the closure movable into and out of engagement with the bottom of the said diaphragm.

This specification signed and witnessed this 29th day of January, 1920.

CHARLES F. HUMMEL.

Witnesses:
FRED'K C. FISCHER,
FERDINAND NOLL.